United States Patent [19]

Spada

[11] 4,239,523
[45] Dec. 16, 1980

[54] METHOD FOR MANUFACTURING PHOSPHATIC FERTILIZERS HAVING A HIGH CONCENTRATION, PARTICULARLY CALCIUM METAPHOSPHATE CA(PO$_3$)$_2$

[76] Inventor: Vittorio Spada, Infanta Maria Teresa St., No. 21, Madrid, Spain

[21] Appl. No.: 927,935

[22] Filed: Jul. 25, 1978

[30] Foreign Application Priority Data

Jan. 31, 1978 [ES] Spain ................................. 466.522

[51] Int. Cl.$^3$ ..................... C05B 17/00; C01B 25/01
[52] U.S. Cl. ..................................... 71/33; 71/44; 71/48; 423/167; 423/314
[58] Field of Search ................. 71/51, 34, 44, 42, 48, 71/33; 423/314, 307, 167, 312

[56] References Cited

U.S. PATENT DOCUMENTS

| | | | |
|---|---|---|---|
| 1,002,143 | 8/1911 | Frerichs | 423/314 X |
| 1,816,051 | 7/1931 | Lloyd et al. | 423/312 X |
| 2,589,272 | 3/1952 | Miller | 71/44 X |
| 3,345,153 | 10/1967 | Lee | 71/33 X |
| 3,595,610 | 7/1971 | Brinkman et al. | 71/34 X |
| 3,653,872 | 4/1972 | Guery | 423/167 X |
| 3,956,464 | 5/1976 | Drechsel et al. | 71/34 X |

FOREIGN PATENT DOCUMENTS

786237 5/1968 Canada.
1049881 7/1957 Fed. Rep. of Germany ............. 71/51

*Primary Examiner*—Kenneth M. Schor
*Attorney, Agent, or Firm*—Young & Thompson

[57] ABSTRACT

A fertilizer rich in calcium metaphosphate is produced by reacting phosphorite or other calcium phosphate-bearing mineral, with ammonium bisulphate to produce a precipitate of calcium sulphate and an aqueous solution rich in ammonium mono- and biphosphates. The latter is then heated in a furnace in the presence of further calcium phosphate-bearing mineral, to produce calcium metaphosphate. The calcium sulphate can be converted to calcium carbonate by reaction with ammonium carbonate, to produce ammonium sulphate. The ammonium sulphate can be heated with the furnace gases from the production of calcium metaphosphate, to produce the required ammonium bisulphate for reaction with phosphorite and the required ammonium carbonate for a conversion of the calcium sulphate to calcium carbonate.

2 Claims, 1 Drawing Figure

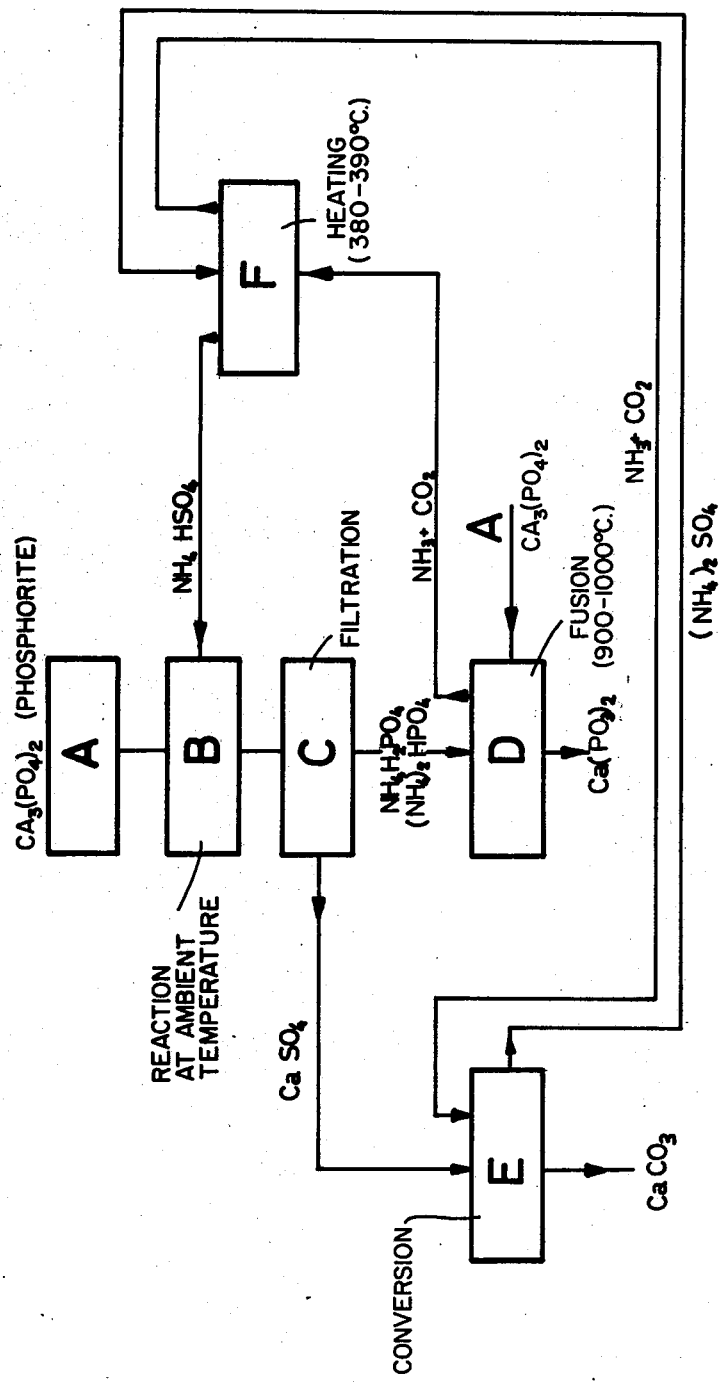

METHOD FOR MANUFACTURING PHOSPHATIC FERTILIZERS HAVING A HIGH CONCENTRATION, PARTICULARLY CALCIUM METAPHOSPHATE CA(PO₃)₂

The subject-matter of the present invention is a method for industrially producing a fertilizer having a high concentration of $P_2O_5$, that is, of calcium metaphosphate $Ca(PO_3)_2$.

The present tendency in the manufacture of phosphatic fertilizers is that of achieving a product with a high concentration of $P_2O_5$, so as to save on transportation expenses. To this end, double and triple phosphates are produced, but manufacturing costs are quite high, and the use of sulphuric acid is required.

The subject-matter of the present invention is a new method for the production of calcium metaphosphate having a theoretical concentration of 71% of $P_2O_5$ soluble in ammonium citrate and, therefore, assimilable by plants. In hitherto known methods, the main expense is represented by the use of considerable amounts of sulphuric acid, which is not employed in the method of this application, and, furthermore, for reasons of transportation, it is necessary to employ minerals with the highest possible $P_2O_5$ content and the lowest limestone ($CaCO_3$) content, which would lead to unnecessary consumption of sulphuric acid.

Metaphosphate is at present produced by volatilization of phosphorus in an electric furnace and the subsequent combustion thereof to $P_2O_5$, but the high cost of carrying out this process, due to the high consumption of electric power, has prevented this product from being widely used.

In the method of the present invention, the reaction of the mineral is carried out, in aqueous medium and at ambient temperature, with an ammonium bisulphate solution which is converted into calcium sulphate, from which the bisulphate can be recovered and recycled; and the extraction yield is practically quantitative with respect to the tricalcium phosphate contained in the mineral.

Another advantage lies in the production of a fertilizer, metaphosphate, which has particularly good characteristics in use, such as its gradual solubility in the soil, which enhances its utilization by plants, since it is not washed away by rain water. Moreover, since the manufacturing process can be carried out "at the pit-mouth", poorer minerals, which are presently rejected in mineral concentration processes, may be used, as well as any other materials containing tricalcium phosphate, even in low concentrations.

The process of the invention will now be described with reference to the attached diagram, in which one embodiment of the invention is shown by way of example only.

In said diagram, "A" means "phosphorite"; "B", "reaction with NH₄HSO₄"; "C", "filtration"; "D", "fusion"; "E", "conversion" and "F", "heating".

In the method only the mineral and a limited thermal energy are used.

The mineral is triturated, as usually done at the present time in the manufacture of these fertilizers, and then it is reacted at ambient temperature with a solution of ammonium bisulphate, as per the reaction

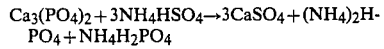

$Ca_3(PO_4)_2 + 3NH_4HSO_4 \rightarrow 3CaSO_4 + (NH_4)_2HPO_4 + NH_4H_2PO_4$

The resulting mixture, with a pH of about 2.7, is raised to a pH of 3.1, which results in the hydrolysis of the iron phosphate and the precipitation of the aluminium phosphate. The mixture is filtered and a cake is obtained composed of calcium sulphate and other insoluble impurities of the mineral, while the solution contains practically all the $P_2O_5$ from the mineral. This solution is added to triturated phosphatic mineral and the resulting mixture is fed into a furnace, preferably of the rotary type, and directly heated by heavy fuel oil, where a reaction occurs between the ammonium phosphates and the mineral, as well as the development of ammonia, which is completely recovered in a subsequent absorption unit. Said mineral is added in proportion to its total content of calcium or basic compounds capable of thermically reacting with ammonium phosphate, so that the resulting mass will have a final composition corresponding to calcium metaphosphate (or to other metaphosphates), with a concentration of about 65% of $P_2O_5$ soluble in ammonium citrate.

The melted metaphosphate leaves the fusion zone of the furnace, where the temperature is about 900° to 1000°, and is granulated in cold water, the final product being obtained in the form of small pellets of this compound.

The entire operation can be carried out on a continuous basis. The cake obtained after filtering the mixture reacted with bisulphate, once washed, is sent to a unit E for conversion of the calcium sulphate with the ammonium carbonate recovered from the fumes from the rotary furnace. This unit is of a commonly known type, and the reaction taking place therein is:

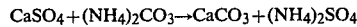

$CaSO_4 + (NH_4)_2CO_3 \rightarrow CaCO_3 + (NH_4)_2SO_4$

In the case of a mineral useful for this operation, it may be previously subjected to levigation or a similar process, using water, to remove any calcium carbonate that may be present. The calcium carbonate is removed by filtration and the ammonium sulphate is fed to a furnace F, where, by heating to approximately 380°–390°, it turns into bisulphate, with development of ammonia, which is recovered in a suitable unit, as previously indicated. The melted bisulphate is dissolved in water to give a concentrated solution used to be reacted with the phosphorite, as mentioned above.

EXAMPLE 100 parts by weight of phosphorite mineral are mixed with a concentrated solution of ammonium bisulphate in the stoichiometric proportion of 1 mole of calcium phosphate and of the other bases present to 3 moles of ammonium bisulphate. The solution is stirred for 2 hours at ambient temperature, the pH being maintained at about 2.7, with automatic pH control and addition of small amounts of bisulphate solution. Finally, the pH value is raised to 3.1 by a subsequent small addition of mineral. The mixture thus obtained is filtered, the cake being removed and, after being washed in water, subjected to conversion with ammonium carbonate. Quantitatively, the liquor contained practically all the $P_2O_5$ contained in the mineral, in the form of mono- and bi-ammonium phosphate.

The liquor is mixed with a further amount of triturated mineral in the proportion of 2 moles of phosphoric radical to 1 mole of calcium phosphate present. The temperature of the mass is set to approximately 1000° in a furnace, thus obtaining a product constituted by melted metaphosphate in the concentration previously indicated. This product is then granulated by stirring in cold water, and metaphosphate is obtained in the form of small pellets.

What I claim is:

1. A method for manufacturing phosphatic fertilizers having a high concentration of calcium metaphosphate, comprising reacting phosphorite with an aqueous solution containing three mols of ammonium bisulphate per mol of calcium phosphate in the phosphorite, said reaction being conducted at ambient temperature, wherein said reaction produces a precipitate of calcium sulphate and an aqueous solution of mono- and diammonium phosphates, separating said precipitate from the last-named solution, then admixing a mineral containing calcium phosphate with said last-named solution of mono- and diammonium phosphates and heating the resultant mixture in a furnace to produce molten calcium metaphosphate, and removing the molten calcium metaphosphate from the furnace.

2. A method as claimed in claim 1, in which said mineral containing calcium phosphate is phosphorite.

* * * * *